US009602716B2

(12) United States Patent
Hirose

(10) Patent No.: US 9,602,716 B2
(45) Date of Patent: Mar. 21, 2017

(54) FOCUS-DETECTION DEVICE, METHOD FOR CONTROLLING THE SAME, AND IMAGE CAPTURE APPARATUS

(71) Applicant: CANON KABUSHIKI KAISHA, Tokyo (JP)

(72) Inventor: Minoru Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 14/837,889

(22) Filed: Aug. 27, 2015

(65) Prior Publication Data

US 2016/0065835 A1    Mar. 3, 2016

(30) Foreign Application Priority Data

Sep. 3, 2014    (JP) .................................. 2014-179520

(51) Int. Cl.
| | | |
|---|---|---|
| *H04N 5/335* | (2011.01) | |
| *H04N 5/232* | (2006.01) | |
| *G02B 7/36* | (2006.01) | |
| *G03B 13/36* | (2006.01) | |
| *H04N 5/235* | (2006.01) | |
| *G02B 7/10* | (2006.01) | |

(52) U.S. Cl.
CPC ......... *H04N 5/23212* (2013.01); *G02B 7/102* (2013.01); *G02B 7/36* (2013.01); *G03B 13/36* (2013.01); *H04N 5/2351* (2013.01)

(58) Field of Classification Search
CPC .............. H04N 5/23212; H04N 5/3696; H01L 27/14623
USPC ........................................................ 348/349
See application file for complete search history.

(56) References Cited

U.S. PATENT DOCUMENTS

| | | | |
|---|---|---|---|
| 2013/0021517 A1* | 1/2013 | Ui ........................ | H04N 5/2254 348/345 |
| 2014/0118610 A1* | 5/2014 | Ohara ................ | H04N 5/23212 348/349 |
| 2014/0204241 A1* | 7/2014 | Ohara .................... | H04N 5/243 348/223.1 |

FOREIGN PATENT DOCUMENTS

| | | |
|---|---|---|
| JP | 3592147 B2 | 11/2004 |
| JP | 2008-052009 A | 3/2008 |

* cited by examiner

*Primary Examiner* — Usman Khan
(74) *Attorney, Agent, or Firm* — Cowan, Liebowitz & Latman, P.C.

(57) ABSTRACT

Disclosed is a focus-detection device capable of performing phase-difference detection type focus detection using outputs of an image sensor, and a method for controlling the same. Phase differences between image signals each of which based on a light beam that has passed through different partial regions of an exit pupil of an imaging optical system, and an image signal based on a light beam that has passed through the entire region of the exit pupil is detected. Then, a defocus amount of the imaging optical system is computed using the sum of the phase differences.

14 Claims, 7 Drawing Sheets

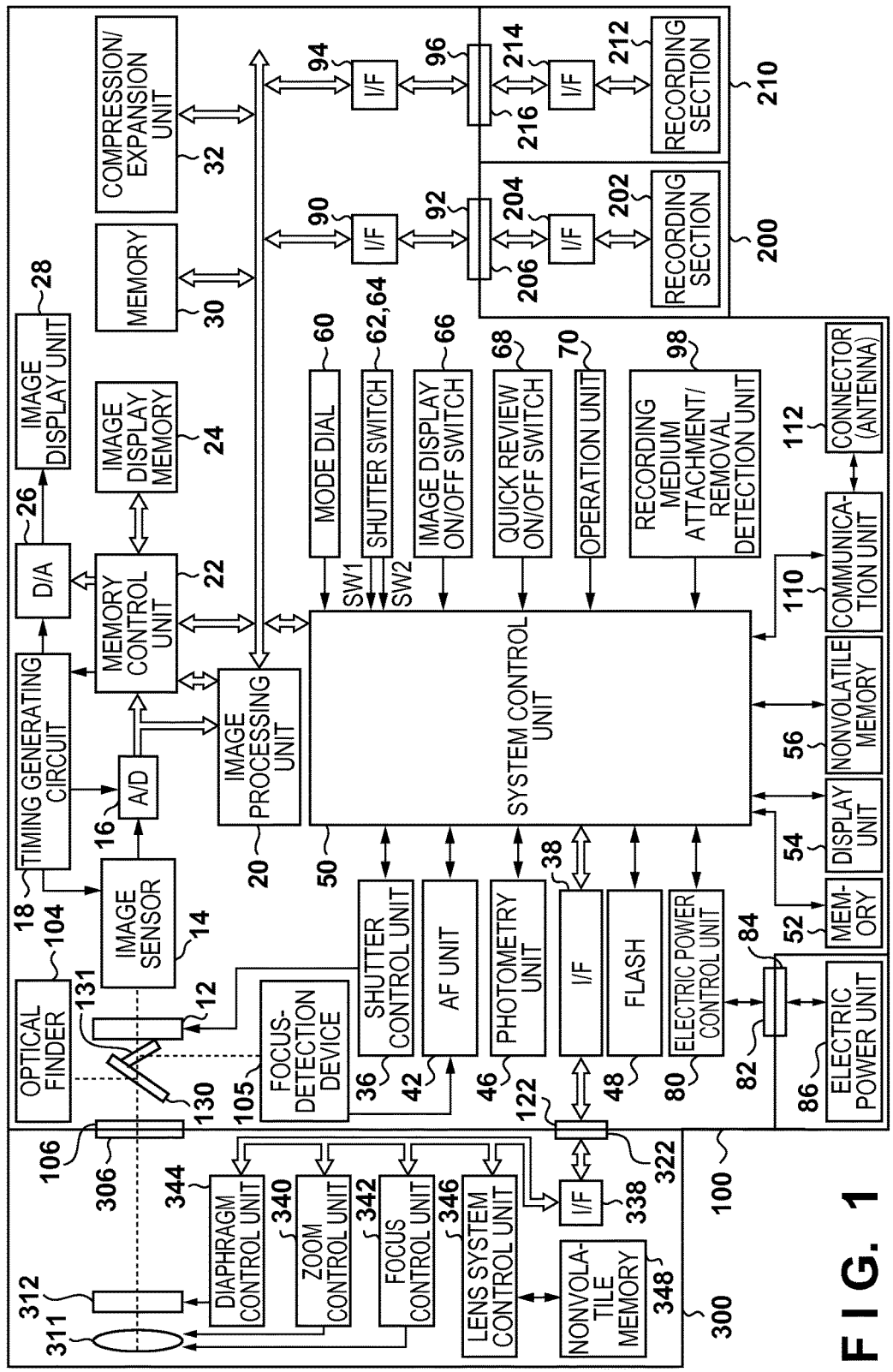
F I G. 1

FOCUS-DETECTION DEVICE, METHOD FOR CONTROLLING THE SAME, AND IMAGE CAPTURE APPARATUS

BACKGROUND OF THE INVENTION

Field of the Invention

The present invention relates to a focus-detection device and a method for controlling the same, and relates particularly to a focus-detection device that performs phase-difference detection type focus detection based on outputs of an image sensor, and a method for controlling the same. The present invention also relates to an image capture apparatus comprising a focus-detection device.

Description of the Related Art

Japanese Patent Laid-Open No. 2008-52009 discloses an apparatus that perform pupil-division type focus detection using an image sensor in which each of two-dimensionally arranged pixels has a microlens. In this apparatus, a photoelectric conversion portion of each pixel has two divided areas that receive, via the microlens, light beams having passed through different regions of an exit pupil of a photographic lens. A correlation operation can be performed on a pair of output signals generated by the plurality of pixels for the respective divided areas so as to compute a phase difference (shift amount) between the pair of output signals, and a defocus amount can be computed based on the phase difference.

Furthermore, Japanese Patent Laid-Open No. 2008-52009 (see FIGS. 24 and 25) and Japanese Patent No. 3592147 disclose image sensors in which some pixels serve as focus detection pixels for use in pupil-division type focus detection. Although outputs of the focus detection pixels need to be corrected in order to be used as outputs of imaging pixels, the number of signals to be read as focus detection signals is smaller than that in the configuration in which a photoelectric conversion portion of each pixel is divided, making it possible to suppress the manufacturing costs of the image sensors and their computation costs in signal processing.

In the configurations using focus detection pixels, a pair of photoelectric conversion portions that receive via the microlenses light beams having passed through different regions of an exit pupil of a photographic lens are arranged in different pixels. That is, in a pair of output signals (an "A image" and a "B image") for use in detecting a phase difference, the position of a pixel group for use in generating the A image and the position of a pixel group for use in generating the B image are different. Accordingly, the A image and the B image may have a low degree of similarity depending on a pattern of a subject image, and in such a case, the accuracy in focus detection may deteriorate.

Furthermore, if the focus detection pixels are disposed at a large distance, there may be the case where frequency components of a high-frequency band of a subject optical image cannot be acquired. Therefore, aliasing occurs differently between the A image and the B image, causing an error in focus detection.

SUMMARY OF THE INVENTION

The present invention improves at least one of the above-described conventional problems. Specifically, the present invention provides a focus-detection device capable of improving the accuracy in phase-difference detection type focus detection using outputs of an image sensor, and a method for controlling the same.

According to an aspect of the present invention, there is provided a focus-detection device comprising: a first detecting unit configured to detect a first phase difference between a first image signal based on a light beam that has passed through a partial region of an exit pupil of an imaging optical system, and a third image signal based on a light beam that has passed through the entire region of the exit pupil; a second detecting unit configured to detect a second phase difference between a second image signal based on a light beam that has passed through another partial region of the exit pupil, and a fourth image signal based on a light beam that has passed through the entire region of the exit pupil; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in a predetermined direction, and the second detecting unit detects the second phase difference while shifting a section of the second image signal with respect to a fixed section of the fourth image signal in the predetermined direction.

According to another aspect of the present invention, there is provided a focus-detection device comprising: a first detecting unit configured to detect a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface; a second detecting unit configured to detect a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in the first direction or the second direction, and the second detecting unit detects the second phase difference while shifting a section of the second image signal with respect to a fixed section of the fourth image signal in the first direction or the second direction.

According to a further aspect of the present invention, there is provided an image capture apparatus comprising: an image sensor capable of reading an image signal based on a light beam that has passed through a partial region of an exit pupil of an imaging optical system, and an image signal based on a light beam that has passed through the entire region of the exit pupil; and a focus-detection device, wherein the focus-detection device comprises: a first detecting unit configured to detect a first phase difference between a first image signal based on a light beam that has passed through a partial region of an exit pupil of an imaging optical system, and a third image signal based on a light beam that has passed through the entire region of the exit pupil; a second detecting unit configured to detect a second phase difference between a second image signal based on a light beam that has passed through another partial region of the exit pupil, and a fourth image signal based on a light beam that has passed through the entire region of the exit pupil; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in a predetermined direction, and the second detecting unit detects the second phase difference while shifting a section of the second image signal with respect to a fixed section of the fourth image signal in the predetermined direction.

According to yet further aspect of the present invention, there is provided an image capture apparatus comprising: an image sensor capable of reading an image signal based on a light beam that has passed through a partial region of an exit pupil of an imaging optical system, and an image signal based on a light beam that has passed through the entire region of the exit pupil; and a focus-detection device according to the present invention.

According to a further aspect of the present invention, there is provided an image capture apparatus comprising: an image sensor capable of reading an image signal based on a light beam that has passed through a partial region of an exit pupil of an imaging optical system, and an image signal based on a light beam that has passed through the entire region of the exit pupil; a focus-detection device; and a focus adjustment unit configured to perform focus adjustment of the imaging optical system based on the defocus amount obtained by the computing unit, wherein the focus-detection device comprises: a first detecting unit configured to detect a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface; a second detecting unit configured to detect a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in the first direction or the second direction, and the second detecting unit detects the second phase difference while shifting a section of the second image signal with respect to a fixed section of the fourth image signal in the first direction or the second direction, wherein the computing unit further evaluates reliability of the defocus amount based on amplitude, sharpnesses, or saturation measures of the third image signal and the fourth image signal, and wherein the focus adjustment unit performs the focus adjustment based on any of the defocus amounts other than that evaluated as having a low reliability.

According to another aspect of the present invention, there is provided a method for controlling a focus-detection device comprising: a first detecting step of detecting a first phase difference between a first image signal based on a light beam that has passed through a partial region of an exit pupil of an imaging optical system, and a third image signal based on a light beam that has passed through the entire region of the exit pupil; a second detecting step of detecting a second phase difference between a second image signal based on a light beam that has passed through another partial region of the exit pupil, and a fourth image signal based on a light beam that has passed through the entire region of the exit pupil; and a computing step of computing a defocus amount of an imaging optical system using a sum of the first phase difference and the second phase difference, wherein in the first detecting step, the first phase difference is detected while a section of the first image signal is shifted with respect to a fixed section of the third image signal in a predetermined direction, and in the second detecting step, the second phase difference is detected while a section of the second image signal is shifted with respect to a fixed section of the fourth image signal in the predetermined direction.

According to a further aspect of the present invention, there is provided a method for controlling a focus-detection device, comprising: a first detecting step of detecting a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface; a second detecting step of detecting a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing step of computing a defocus amount of the imaging optical system using a sum of the first phase difference and the second phase difference, wherein in the first detecting step, the first phase difference is detected while a section of the first image signal is shifted with respect to a fixed section of the third image signal in the first direction or the second direction, and in the second detecting step, the second phase difference is detected while a section of the second image signal is shifted with respect to a fixed section of the fourth image signal in the first direction or the second direction.

According to a further aspect of the present invention, there is provided a non-transitory computer-readable storage medium having stored therein a program for causing a computer to function as a focus-detection device according to the present invention.

Further features of the present invention will become apparent from the following description of exemplary embodiments with reference to the attached drawings.

BRIEF DESCRIPTION OF THE DRAWINGS

FIG. 1 is a block diagram illustrating an example of a functional configuration of a camera system serving as an example of an image capture apparatus including a focus adjustment device according to an embodiment.

DESCRIPTION OF THE EMBODIMENTS

First Embodiment

Figure 2A:
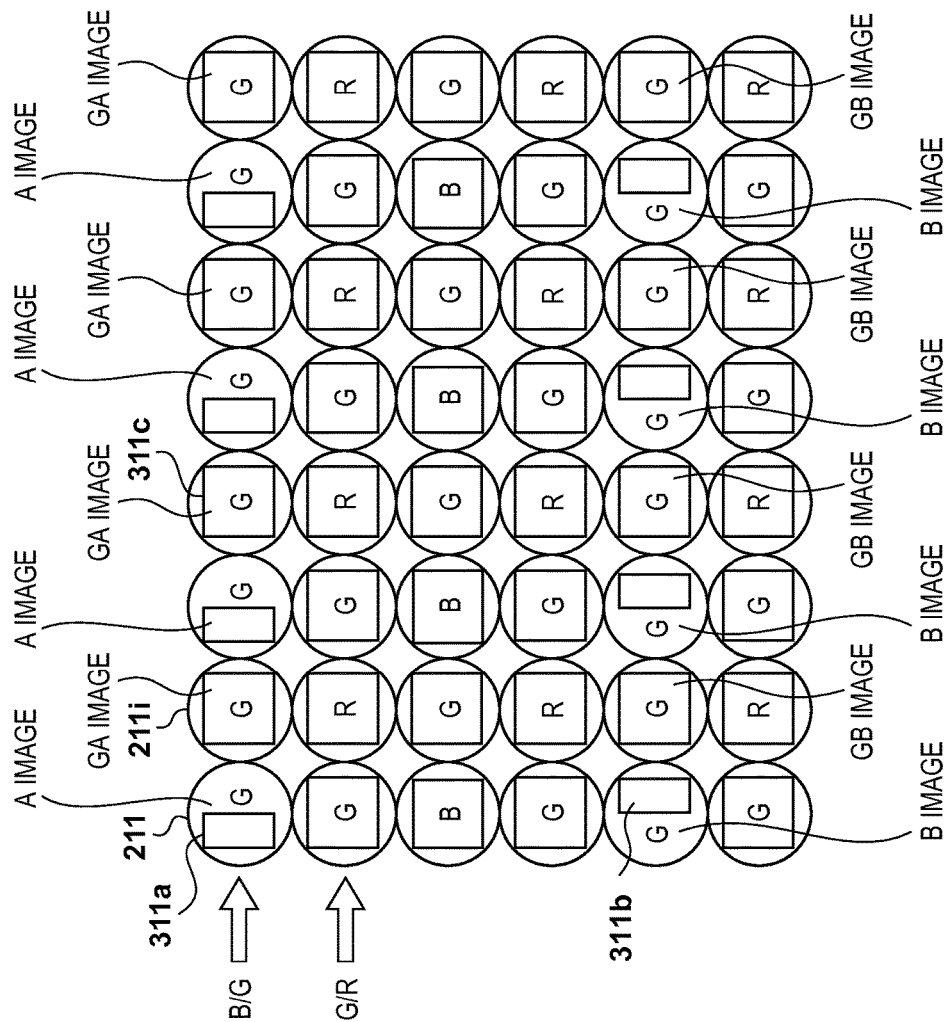
FIGS. 2A and 2B are diagrams illustrating an example of a configuration of an image sensor according to a first embodiment.

Exemplary embodiments of the present invention will now be described in detail with reference to the accompanying drawings.

FIG. 1 is a diagram illustrating an example of a configuration of a camera system that serves as an example of an image capture apparatus including a focus-detection device according to the embodiment of the present invention, and that is constituted by a camera and an exchangeable photographic lens. In FIG. 1, the camera system is constituted by a camera 100 and an exchangeable photographic lens 300.

A light beam that has passed through the photographic lens 300 passes through a lens mount 106, and is reflected upward by a main mirror 130 so as to be incident on an optical finder 104. While observing a subject using the optical finder 104, a photographer can photograph a subject optical image. Some functions of a display unit 54, such as for example, focus display, camera shake warning display, f-number display, and exposure compensation display, and the like are realized in the optical finder 104.

A part of the main mirror 130 is a semi-transmissive half mirror, and a part of the light beam that is incident on the main mirror 130 passes through this half mirror part and is reflected downward by a sub mirror 131 so as to be incident on a focus-detection device 105. The focus-detection device 105 is a phase-difference detection type focus-detection device that includes a secondary imaging optical system and a line sensor, and outputs a pair of image signals to an AF unit (autofocusing unit) 42. The AF unit 42 performs calculation for detecting a phase-difference between the pair of image signals, and obtains the defocus amount and direction of the photographic lens 300. Based on the calculation result, a system control unit 50 performs control such as focus adjustment processing on a focus control unit 342 (described later) of the photographic lens 300. In the present embodiment, the AF unit 42 also performs correction of a focus detection result.

When performing, after the focus adjustment processing of the photographic lens 300, still image photography, electronic finder display, or moving image photography, the main mirror 130 and the sub mirror 131 are moved away from the optical path by a quick return mechanism (not shown). Accordingly, the light beam that passes through the photographic lens 300 and is incident on the camera 100 can be incident on an image sensor 14 via a shutter 12 for controlling an exposure amount. After the photographing operation of the image sensor 14, the main mirror 130 and the sub mirror 131 return to the positions as illustrated.

The image sensor 14 is a CCD or CMOS image sensor that has a configuration in which a plurality of pixels are arranged two-dimensionally, and photoelectrically converts each pixel of the subject optical image into an electrical signal and outputs the electrical signals. The electrical signals photoelectrically converted by the image sensor 14 are transmitted to an A/D converter 16, where the analog signal outputs are converted into digital signals (image data). A timing generating circuit 18 supplies a clock signal or a control signal to the image sensor 14, the A/D converter 16, and a D/A converter 26. The timing generating circuit 18 is controlled by a memory control unit 22 and the system control unit 50. An image processing unit 20 applies predetermined processing, such as pixel interpolation processing, white balance adjustment processing, or color conversion processing, to image data from the A/D converter 16 or image data from the memory control unit 22.

The image sensor 14 according to the present embodiment has some pixels that are configured to serve as focus detection pixels, and can perform phase-difference detection type focus detection even in the state in which the main mirror 130 and the sub mirror 131 are moved away from the optical path by the quick return mechanism. Of the image data acquired by the image sensor 14, data of pixels for use in generating a focus detection signal is converted into focus detection data in the image processing unit 20. Then, the focus detection data is transmitted to the AF unit 42 via the system control unit 50, and the AF unit 42 performs focus adjustment of the photographic lens 300 based on the focus detection data.

Note that contrast type AF is also possible in which the image processing unit 20 calculates a contrast evaluation value based on data of an image taken by the image sensor 14 and the system control unit 50 controls the focus control unit 342 of the photographic lens 300 to perform focusing. Accordingly, the camera 100 of the present embodiment can perform both phase-difference detection type AF and contrast type AF based on image data acquired by the image sensor 14 even when the main mirror 130 and the sub mirror 131 are moved away from the optical path, such as at the time of live view display or moving image photography. Furthermore, the camera 100 of the present embodiment can perform phase-difference detection type AF using the focus-detection device 105 in the case of normal still image photography in which the main mirror 130 and the sub mirror 131 are located in the optical path. Accordingly, focus adjustment is possible in all the states of still image photography, live view display, and moving image photography.

The memory control unit 22 controls the A/D converter 16, the timing generating circuit 18, the image processing unit 20, an image display memory 24, the D/A converter 26, a memory 30, and a compression/expansion unit 32. Data of the A/D converter 16 is written into the image display memory 24 or the memory 30 via both the image processing unit 20 and the memory control unit 22, or via only the memory control unit 22. The image data that was written into the image display memory 24 and is to be displayed is displayed on an image display unit 28 constituted by a liquid crystal monitor or the like, via the D/A converter 26. By successively displaying moving images taken by the image sensor 14 on the image display unit 28, it is possible to realize the electronic finder function (live view display). The image display unit 28 can be turned on/off in accordance with an instruction of the system control unit 50, and it is possible to reduce the electric power consumption of the camera 100 when the image display unit 28 is turned off.

Furthermore, the memory 30 is used for temporarily storing a photographed still image or moving image, and has a memory capacity sufficient for storing a predetermined number of still images and a predetermined duration of moving images. Accordingly, it is possible to perform high-speed writing of a large amount of images into the memory 30 in the case of successive photography or panoramic photography as well. Furthermore, the memory 30 can be used as a work area of the system control unit 50. The compression/expansion unit 32 has functions to compress and expand image data using adaptive discrete cosine transformation (ADCT) or the like, and is configured to read the image stored in the memory 30, to perform compression processing or expansion processing on the read image, and to write the processed image data back to the memory 30.

Based on photometric information from a photometry unit 46, a shutter control unit 36 controls the shutter 12 in cooperation with a diaphragm control unit 344 for controlling a diaphragm 312 of the photographic lens 300. An interface unit 38 and a connector 122 electrically connect the camera 100 and the photographic lens 300. These constituent components have a function to intermediate transfer of a control signal, a state signal, a data signal, and the like and supply of electric currents of various voltages, between the camera 100 and the photographic lens 300. Furthermore, the constituent components may be configured to intermediate, in addition to electrical communication, optical communication, sound communication, and the like.

The photometry unit 46 performs automatic exposure control (AE) processing. By the light beam having passed through the photographic lens 300 being incident on the photometry unit 46 via the lens mount 106, the main mirror 130, and a photometric lens (not shown), it is possible to measure the brightness of the subject optical image. The photometry unit 46 can determine the exposure condition using a program chart in which a subject brightness and an exposure condition are associated with each other, or the like. The photometry unit 46 also have a function to perform modulation processing in cooperation with a flash 48. Note that it is also possible for the system control unit 50 to perform AE control on the shutter control unit 36 and the diaphragm control unit 344 of the photographic lens 300, based on a calculation result obtained by the image processing unit 20 calculating image data of the image sensor 14. The flash 48 also have a function to project AF auxiliary light and a function to modulate flash light.

The system control unit 50 includes a programmable processor such as, for example, a CPU or MPU, and controls overall operations of the camera system by executing a program stored in advance. In a nonvolatile memory 52, constants, variables, programs, and the like for use in operating the system control unit 50 are stored. The display unit 54 is, for example, a liquid crystal display device that displays an operation state, a message, and the like using characters, images, sounds, and the like, in accordance with execution of the program in the system control unit 50. A single or a plurality of the display units 54 are installed at one or more positions in the vicinity of operation units of the camera 100 at which it can easily be viewed, and each display unit is constituted by a combination of, for example, a LCD, LEDs, and the like. Among display contents of the display unit 54, contents that are displayed on the LCD or the like include information on the number of photography, such as the number of recorded images or the number of possible shot, information on the photography condition, such as shutter speed, f-number, exposure compensation, or flash condition. Moreover, remaining battery level, date/time, and the like are also displayed. As described above, some functions of the display unit 54 are realized in the optical finder 104.

A nonvolatile memory 56 is an electrically erasable/recordable memory, and may use, for example, an EEPROM or the like. The reference numerals 60, 62, 64, 66, 68, and 70 denote operation units for inputting various types of operational instructions of the system control unit 50, and each unit is configured by one of, or a combination of a switch, a dial, a touch panel, a pointing by sight line detection, a sound recognition device, and the like.

A mode dial 60 can switch and set function modes such as power off, an automatic photography mode, a manual photography mode, a playback mode, or a PC connection mode. The shutter switch SW1 62 is turned on when a shutter button (not shown) is pushed half way down, and instructs the operation start of AF processing, AE processing, AWB processing, EF processing, or the like. The shutter switch SW2 64 is turned on when the shutter button is pushed all the way down, and instructs the operation start of a series of processing regarding photography. "Series of processing regarding photography" include exposure processing, development processing, recording processing, and the like. In the exposure processing, a signal read from the image sensor 14 is written as image data into the memory 30 via the A/D converter 16 and the memory control unit 22. In the development processing, calculation in the image processing unit 20 and the memory control unit 22 is used to perform development. In the recording processing, image data is read from the memory 30, is subjected to compression in the compression/expansion unit 32, and is written as image data into a recording medium 200 or 210.

The image display ON/OFF switch 66 can set the image display unit 28 on/off. With this function, current supply to the image display unit 28, which is constituted by a liquid crystal monitor and the like, is blocked when photography is performed using the optical finder 104, making electric power saving possible. The quick review ON/OFF switch 68 sets a quick review function to automatically playback photographed image data immediately after photography. The operation unit 70 is constituted by various types of buttons, a touch panels, and the like. The various types of buttons include a menu button, a flash setting button, a switch button for switching among single shot/successive shot/self-timer, an exposure compensation button, and the like.

An electric power control unit 80 is constituted by a battery detection circuit, a DC/DC converter, a switching circuit for switching a block to be energized, and the like. Detection is performed as to whether a battery is attached, the type of the battery, and the remaining battery level, the DC/DC converter is controlled based on the detection result and an instruction of the system control unit 50, and a required voltage is supplied for a required time period to the units including the recording medium. Connectors 82 and 84 connect an electric power unit 86 constituted by a primary battery such as an alkaline battery or a lithium battery, a secondary battery such as a NiCd battery, a NiMH battery, or a lithium ion battery, an AC adapter, and the like, to the camera 100.

Interfaces 90 and 94 have a connection function to a recording medium such as a memory card or a hard disk, and connectors 92 and 96 physically connect to a recording medium such as a memory card or a hard disk. A recording medium attachment/removal detection unit 98 detects whether or not a recording medium is attached to the connector 92 or 96. Note that in the present embodiment, description is given assuming that two systems of interfaces and connectors to which a recording medium is attached are provided, but a configuration is also possible in which a single system of interface and connector is provided, or multiple systems of interfaces and connectors are provided. Furthermore, a configuration is also possible in which interfaces and connectors of different standards are provided in a combined manner. Furthermore, by connecting any type of communication card, such as a LAN card, to the interfaces and the connectors, it is possible to transfer image data and administrative information associated with the image data to and from another peripheral device such as a computer or a printer.

A communication unit 110 has a function to perform various types of communication, such as wired communication or wireless communication. A connector 112 connects the camera 100 to another device using the communication unit 110, the connector 112 serving as an antenna in the case of wireless communication. The recording media 200 and 210 are memory cards, hard disks, or the like. The recording media 200 and 210 respectively include recording sections 202 and 212 constituted by a semiconductor memory, a magnetic disk, or the like, interfaces 204 and 214 to the camera 100, and connectors 206 and 216 that connect to the camera 100.

The following will describe the photographic lens 300. The photographic lens 300 is mechanically and electrically coupled to the camera 100 by engaging a lens mount 306 with the lens mount 106 of the camera 100. Electrical coupling is realized by the connector 122 of the lens mount 106 and a connector 322 of the lens mount 306. A lens 311 includes a focus lens for adjusting the focal length of the photographic lens 300, and the focus control unit 342 drives the focus lens in the optical axis, thereby performing focus adjustment of the photographic lens 300. The diaphragm 312 adjusts the amount and angle of subject light that is incident on the camera 100.

The connector 322 and an interface 338 electrically connect the photographic lens 300 to the connector 122 of the camera 100. The connector 322 has a function to intermediate transfer of a control signal, a state signal, a data signal, and the like and supply of electric currents of various voltages, between the camera 100 and the photographic lens 300. The connector 322 may be configured to intermediate, in addition to electrical communication, optical communication, sound communication, and the like.

A zoom control unit 340 drives a magnification changeable lens of the lens 311 to adjust the focal length (angle of view) of the photographic lens 300. When the photographic lens 300 is a single focus lens, the zoom control unit 340 is not provided. Based on the photometric information from the photometry unit 46, the diaphragm control unit 344 controls the diaphragm 312 in cooperation with the shutter control unit 36 for controlling the shutter 12.

A lens system control unit 346 includes a programmable processor such as, for example, a CPU or MPU, and controls overall operations of the photographic lens 300 by executing a program stored in advance. The lens system control unit 346 has a function as a memory in which constants, variables, programs, and the like for use in operating the photographic lens are stored. In a nonvolatile memory 348, identification information such as the number specific to the photographic lens, administrative information, functional information such as the maximum f-number and the minimum f-number, the focal length, current and previous setting values, and the like are stored.

In the present embodiment, information on a lens frame depending on the state of the photographic lens 300 is also stored. This lens frame information refers to information on the radius of a frame aperture that determines a light beam passing through the photographic lens 300, and information on the distance between the image sensor 14 and the frame aperture. The diaphragm 312 is included in the frame that determines a light beam passing through the photographic lens, and an aperture of a lens frame member for holding the lens, and the like are also included in the frame. Furthermore, because the frame that determines a light beam passing through the photographic lens is different depending on the focus position or a zooming position of the lens 311, there are provided multiple types of lens frame information according to the focus positions and zooming positions of the lens 311. When the camera 100 performs focus detection using the focus-detection device, appropriate lens frame information that corresponds to the focus position and zooming position of the lens 311 is selected and transmitted to the camera 100 via the connector 322.

This is the configuration of the camera system constituted by the camera 100 and the photographic lens 300, according to the present embodiment.

The following will describe the operation of phase-difference detection type focus detection using the image sensor 14.

FIG. 2A is a diagram schematically illustrating an example of the pixel array of the image sensor 14 of the present embodiment, the diagram showing the state in which a range of six rows in a vertical direction (Y-axis direction) and eight columns in a horizontal direction (X-axis direction) of a two-dimensionally arranged pixel group of the CMOS image sensor is viewed from the photographic lens 300 side. The image sensor 14 has color filters in the Bayer arrangement, in which green and red color filters are alternately provided in the stated order from the left on the pixels in even number rows, and blue and green color filters are alternately provided in the stated order from the left on the pixels in odd number rows. However, in the image sensor 14 of the present embodiment, instead of the original blue color filters, green color filters are provided on the pixels that have a photoelectric conversion portion for focus detection. Note that in the following description, a pixel on which a blue (or green or red) color filter is provided may be referred to as a blue pixel (or a green pixel or a red pixel).

Furthermore, each pixel is provided with an on-chip microlens 211$i$, and a rectangle in each on-chip microlens 211$i$ schematically shows a light-receiving region of the photoelectric conversion portion. Photoelectric conversion portions 311$a$ and 311$b$ for focus detection are arranged in a manner of being displaced horizontally from the centers of the corresponding pixels. Note that in the following description, the pixels on which the photoelectric conversion portions 311$a$ and 311$b$ for focus detection are provided may be referred to as "focus detection pixels". Furthermore, the photoelectric conversion portions 311$a$ and 311$b$ for focus detection are arranged on green pixels that are arranged instead of original blue pixels. This is because outputs of the blue pixels least affect the image quality. Note that the present invention does not depend on the color filter pattern of the image sensor. Accordingly, in the image sensor 14 of the present embodiment, each of the pixels including the focus detection pixels has one photoelectric conversion portion, and thus one photoelectric conversion signal is read from one pixel.

The following will describe generation of an image signal for use in phase-difference detection type focus detection. In the present embodiment, four types of image signals are generated. As will be described later, in the present embodiment, the microlenses 211i and the photoelectric conversion portions 311a and 311b, which are displaced to different positions, are used to divide an exit pupil of the imaging optical system (photographic lens 300). An "A image" is an image signal obtained by concatenating outputs of a plurality of photoelectric conversion portions 311a on the pixels 211 arranged in the same pixel row (in the X-axis direction), and a "B image" is an image signal obtained by concatenating outputs of a plurality of photoelectric conversion portions 311b on the pixels 211 arranged in the same pixel row. As shown in FIG. 2A, the A image and the B image can be obtained by (green pixels) at a plurality of blue pixel positions that are adjacent to each other at two pixel pitch in the X-axis direction.

Furthermore, a "GA image" is an image signal obtained by concatenating outputs of photoelectric conversion portions 311c of a plurality of green pixels that are adjacent to the photoelectric conversion portions 311a in the X-axis direction of FIG. 2A. Moreover, a "GB image" is an image signal obtained by concatenating outputs of photoelectric conversion portions 311c of a plurality of green pixels that are adjacent to the photoelectric conversion portions 311b in the X-axis direction of FIG. 2A. The photoelectric conversion portions 311a and 311b output a signal based on a light beam that has passed through a partial region of the exit pupil of the imaging optical system (photographic lens 300), whereas the photoelectric conversion portions 311c output a signal based on a light beam that has passed through the entire region of the exit pupil of the imaging optical system (photographic lens 300). Accordingly, by acquiring the A image, the B image, the GA image, and the GB image from the same color pixel group, it is possible to achieve highly accurate phase difference detection.

Note that the positions and the numbers of the pixels for use in generating the A image, the B image, the GA image, and the GB image are determined depending on the focus detection region.

By detecting a relative image shift amount between the A image and GA image generated in this manner, and a relative image shift amount between the B image and the GB image generated in this manner using correlation operation, it is possible to detect a focus shift amount, that is, a defocus amount in a predetermined region. According to the present embodiment, imaging pixel signals can be acquired from the pixels (which may be referred to as photographing pixels in the following description) that have the photoelectric conversion portion 311c located in a manner of not displaced from the center of the pixel. When generating a photography image, imaging pixel signals at positions corresponding to the focus detection pixels are generated (interpolated) using outputs of their peripheral pixels. Note that when generating imaging pixel signals, outputs of the corresponding focus detection pixels may be used or may not be used.

Hereinafter, the plurality of pixels on which the photoelectric conversion portions 311a for use in generating the A image (first image signal) are provided are collectively referred to as a first pixel group, and the plurality of pixels on which the photoelectric conversion portions 311b for use in generating the B image (second image signal) are provided are collectively referred to as a second pixel group. Furthermore, the plurality of pixels on which the photoelectric conversion portions 311c for use in generating the GA image (third image signal) are provided are collectively referred to as a third pixel group, and the plurality of pixels on which the photoelectric conversion portions 311c for use in generating the GB image (fourth image signal) are provided are collectively referred to as a fourth pixel group.

Note that in the present embodiment, the third pixel group and the fourth pixel group are respectively pixel groups that are adjacent to the first pixel group or the second pixel group in the X-axis direction. However, the third pixel group and the fourth pixel group may respectively be pixel groups that are adjacent to the first pixel group or the second pixel group in the Y-axis direction. Alternatively, the GA image and the GB image may be generated using pixel values acquired from other pixels. For example, the GA image may be generated using pixel values computed as averages of multiple (for example, four) pixels adjacent to each of the pixels of the first pixel group.

Basically, effects of the present invention can be achieved by selecting the third pixel group so that the distance between the first pixel group and the third pixel group is shorter than the distance between the first pixel group and the second pixel group, in the direction perpendicular to the phase-difference detection direction. Similarly, the fourth pixel group may be selected so that the distance between the second pixel group and the fourth pixel group is shorter than the distance between the first pixel group and the second pixel group. When the pixel values of the third and fourth pixel groups are generated based on other pixel values, a virtual pixel position of each pixel of the third and fourth pixel groups may be selected in the same manner.

Figure 2B:
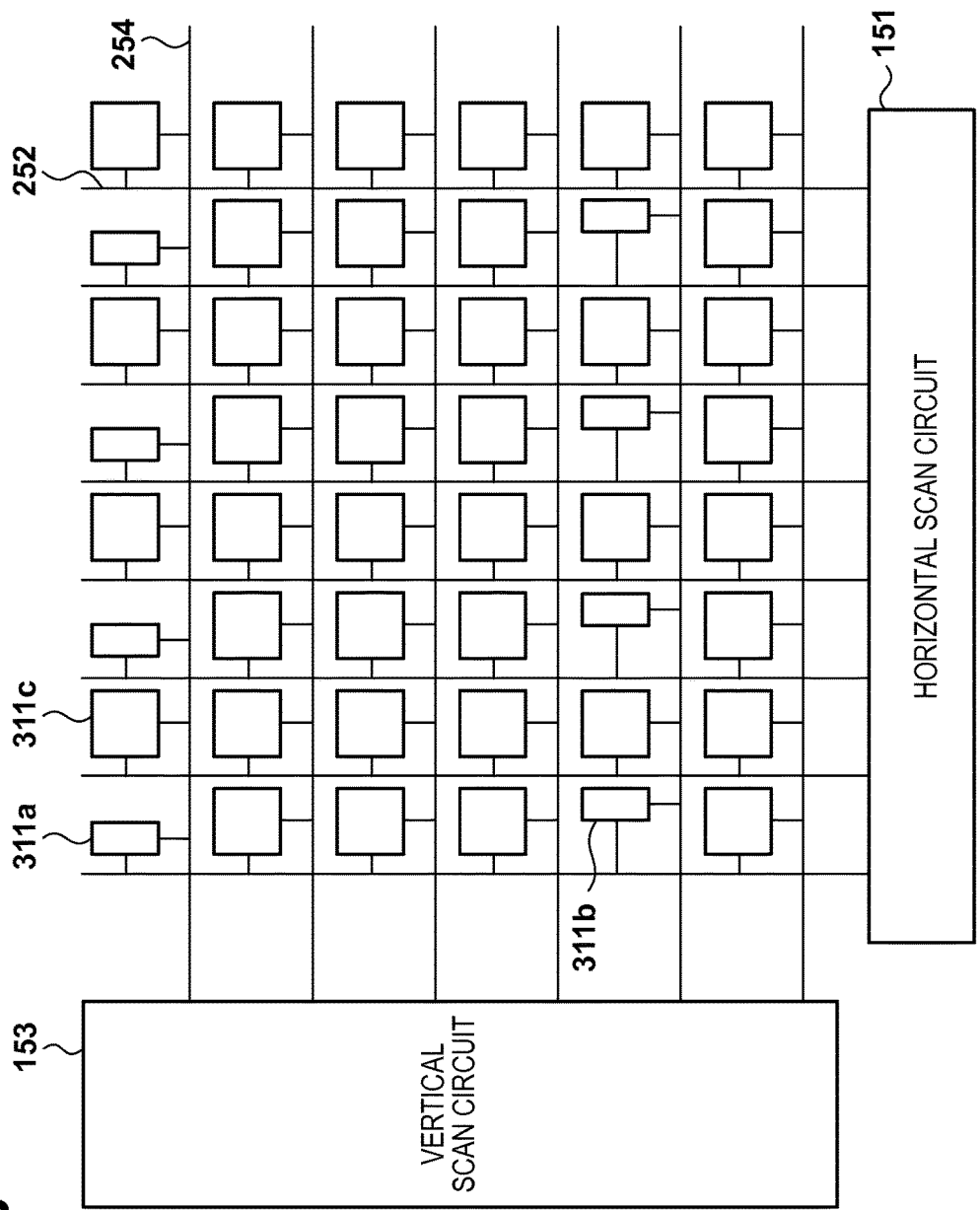

FIG. 2B is a diagram illustrating an example of a configuration of a reading circuit of the image sensor 14 of the present embodiment. The image sensor 14 includes a horizontal scan circuit 151 and a vertical scan circuit 153, and horizontal scan lines 252 and vertical scan lines 254 are arranged on boundaries of the pixels. Signals generated in the photoelectric conversion portions 311a, 311b, and 311c are read to the outside via the horizontal scan lines 252 and the vertical scan lines 254.

Figure 3A:
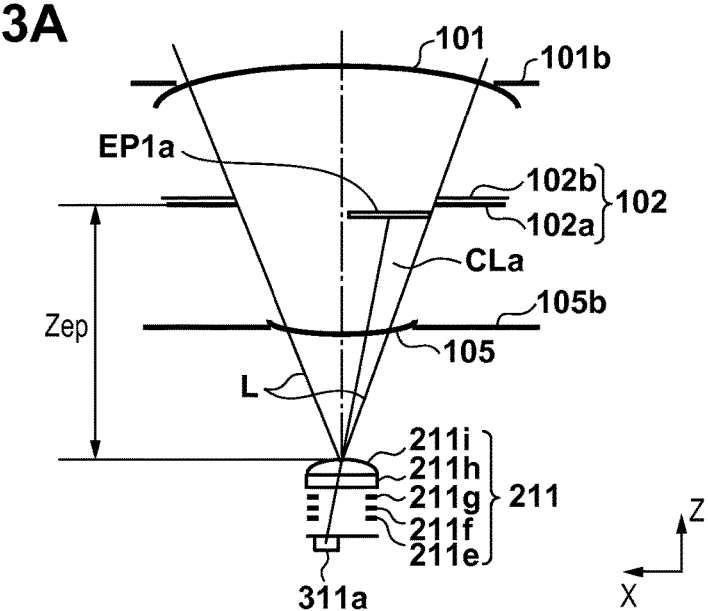
FIGS. 3A to 3C are diagrams illustrating the relationship between the photoelectric conversion areas and the exit pupil according to the first embodiment.
Figure 3B:
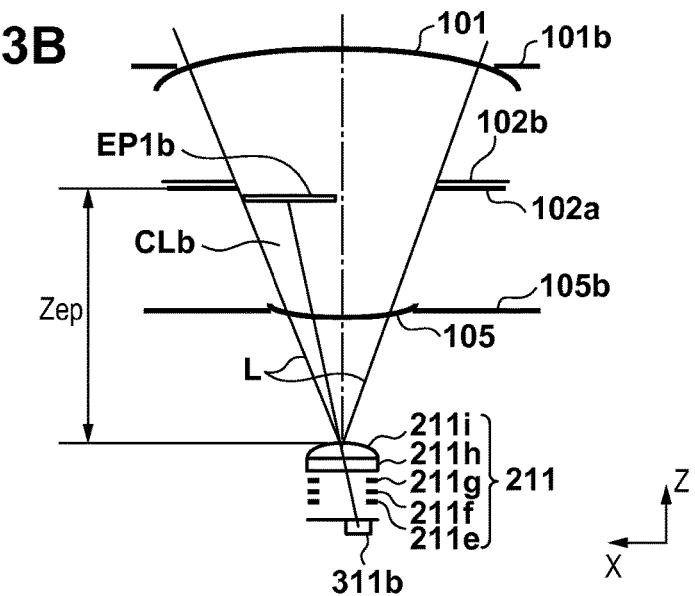
Figure 3C:
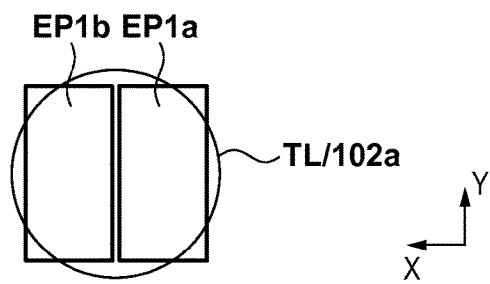

FIGS. 3A to 3C are diagrams illustrating the conjugate relation between the exit pupil surface of the photographic lens 300 and the photoelectric conversion portions 311a and 311b of the pixels 211 arranged in the vicinity of the center of the image plane of the image sensor 14. The photoelectric conversion portions 311a and 311b of the image sensor 14 and the exit pupil surface of the photographic lens 300 are designed as having the conjugate relation by the on-chip microlenses 211i. Furthermore, it is common that the exit pupil surface of the photographic lens 300 substantially matches a surface on which an iris diaphragm for adjusting a light amount is provided.

On the other hand, the photographic lens 300 of the present embodiment is a magnification changeable zoom lens. Some zoom lens have a configuration in which when its magnification is changed, the size of the exit pupil or the distance between the image plane and the exit pupil (exit pupil distance) changes. FIGS. 3A to 3C show the state in which the focal length of the photographic lens 300 is in the middle between the wide angle end and the telephoto end. Taking an exit pupil distance Zep in this state as a standard, the shape of the on-chip microlens and eccentricity parameters depending on the image height are appropriately designed.

In FIGS. 3A to 3C, the photographic lens 300 includes a first lens group 101, a lens barrel member 101b that holds the first lens group, a third lens group 105, and a lens barrel member 105b that holds the third lens group. Furthermore, the photographic lens 300 includes a diaphragm 102, an aperture plate 102a that defines an aperture diameter at the maximum f-number, and a diaphragm blade 102b for adjusting the aperture diameter when the aperture is decreased. Note that FIGS. 3A to 3C show the constituent components 101b, 102a, 102b, and 105b, which function as members for restricting a light beam that passes through the photographic lens 300, as optical virtual images when observed from the image plane. Furthermore, a synthetic aperture in the vicinity of the diaphragm 102 is defined as the exit pupil of the photographic lens 300, and has the exit pupil distance Zep.

The photoelectric conversion portion 311a (FIG. 3A), the photoelectric conversion portion 311b (FIG. 3B), or the photoelectric conversion portion 311c (not shown) is arranged in the lowermost layer of the pixel 211. Interconnect layers 211e to 211g, a color filter 211h, and the on-chip microlens 211i are provided above each of the photoelectric conversion portions 311a to 311c. The photoelectric conversion portions 311a to 311c are projected onto the exit pupil surface of the photographic lens 300 by the on-chip microlenses 211i. In other words, the exit pupil is projected onto the surfaces of the photoelectric conversion portions 311a to 311c via the on-chip microlenses 211i.

FIG. 3C shows projection images EP1a and EP1b of the photoelectric conversion portions 311a and 311b on the exit pupil surface. Note that a projection image EP1c of the photoelectric conversion portion 311c is substantially equal to the sum of EP1a and EP1b. The barycenter position, on the exit pupil surface of the imaging optical system, of a light beam incident on the photoelectric conversion portion 311a (barycenter position of the projection image EP1a) is displaced from the center in the right direction (first direction). On the other hand, the barycenter position, on the exit pupil surface of the imaging optical system, of a light beam incident on the photoelectric conversion portion 311b (barycenter position of the projection image EP1b) is displaced from the center in the left direction (second direction), in a manner opposite to the barycenter position of the light beam incident on the photoelectric conversion portion 311a. Furthermore, the barycenter position, on the exit pupil surface of the imaging optical system, of a light beam incident on the photoelectric conversion portion 311c (barycenter position of the projection image EP1c) is not displaced from the center in the right or left direction (in the present embodiment, not in the up or down direction as well).

In FIGS. 3A and 3B, "L" denotes the outermost part of the light beam passing through the photographic lens 300. The outermost part L of the light beam is defined by the aperture plate 102a of the diaphragm, and in the photographic lens 300, vignetting hardly occurs in the projection images EP1a and EP1b. FIG. 3C shows a circle TL that is formed on the exit surface by the outermost part L of the light beam in FIGS. 3A and 3B. From the fact that the most parts of the projection images EP1a and EP1b of the photoelectric conversion portions 311a and 311b are present within the circle TL, it is clear that vignetting hardly occurs. Since the outermost part L of the light beam is defined by the aperture plate 102a of the diaphragm, it is possible to express TL=102a. At that time, on the center of the image plane, the vignetting states of the projection images EP1a and EP1b are symmetric about the optical axis, and the amounts of light received by the photoelectric conversion portions 311a and 311b are equal to each other. Accordingly, the image sensor 14 of the present embodiment has not only the photographing function but also a function as a device for generating signals for use in phase-difference detection type focus detection.

Figure 4A:
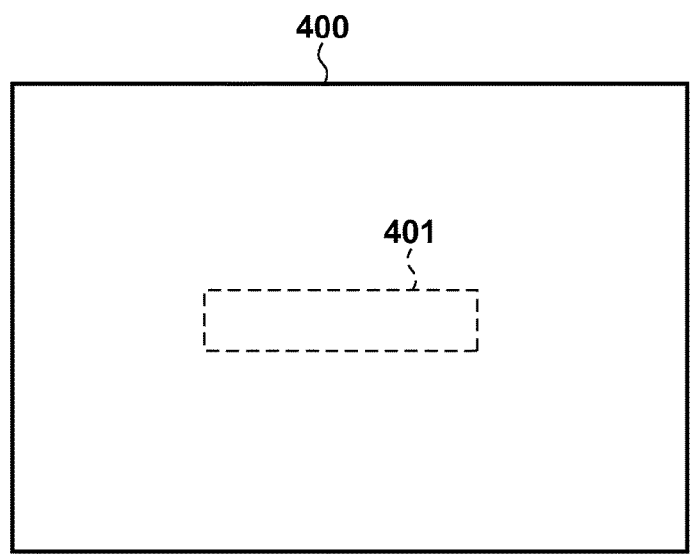
FIGS. 4A and 4B are diagrams illustrating an example of the relationship between the focus detection region and the pixels for use in AF signals, according to the embodiment.

FIG. 4A is a diagram illustrating an example of a focus detection region 401 that is set in a photography range 400.

When performing focus detection using outputs of the pixels of the image sensor 14, outputs of the pixels included in the region of the image sensor 14 that corresponds to the focus detection region 401 are used in both cases of contrast detection type focus detection and phase-difference detection type focus detection. It is thus also conceivable that the focus detection region 401 is set in the image sensor 14, and for ease of explanation and understanding, the following description will be given assuming that the focus detection region 401 is a pixel region of the image sensor 14.

It is here assumed that the photoelectric conversion portions 311a to 311c are provided on the pixel in the focus detection region 401, complying with the rule as shown in FIG. 2A. Because the focus detection pixels that include the photoelectric conversion portions 311a and 311b, which are respectively displaced from the centers of the pixels in the horizontal (X-axis) direction, are used, a phase difference between image signals is detected based on a contrast difference in the horizontal direction of the image in the focus detection region 401.

The phase difference that is here detected occurs due to a difference in the traveling angle between a pair of light beams, and a phase difference per unit defocus amount is proportional to the distance between the barycenters, in the regions on the exit pupil surface, of the light beams that generate the pair of image signals. As described above, the projection image EP1c of the photoelectric conversion portion 311c is substantially equal to the sum of the projection images EP1a and EP1b. Therefore, the barycenter position of the projection image EP1c is located in the middle of the pair of barycenter positions of the projection images EP1a and EP1b. Accordingly, a phase difference between the pair of image signals (A image and B image) obtained by the photoelectric conversion portions 311a and 311b is about twice as much as a phase difference between the pair of image signals (the A image (B image) and the GA image (GB image)) obtained by the photoelectric conversion portions 311a (311b) and 311c.

Since the projection image EP1c is common to the GA image and the GB image, the light beam for generating the GA image and the light beam for generating the GB image have the same barycenter position on the exit surface. Accordingly, the sum of a phase difference between the A image and the GA image that are obtained based on outputs of the photoelectric conversion portions 311a and 311c and a phase difference between the B image and GB image that are obtained based on outputs of the photoelectric conversion portions 311b and 311c is substantially equal to a phase difference between the A image and the B image that are obtained based on outputs of the photoelectric conversion portions 311a and 311b.

Figure 4B:
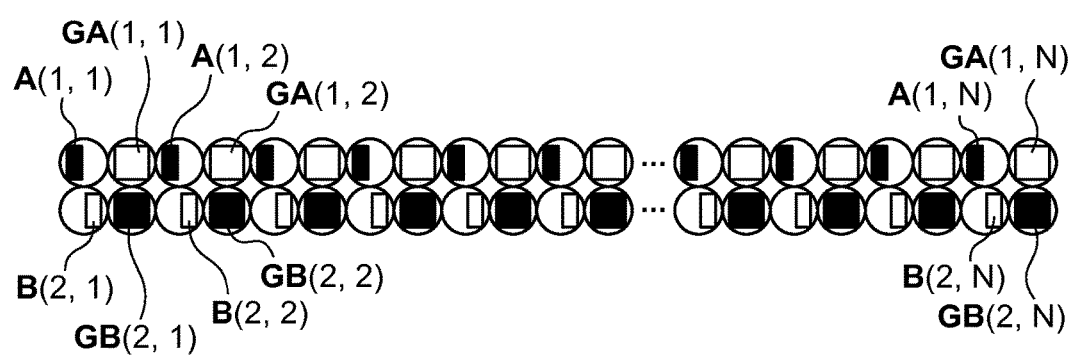

FIG. 4B is a diagram showing pixels for use in generating AF image signals that are extracted from the pixels included in the focus detection region 401, the diagram illustrating which image signals are generated by outputs of the respective extracted pixels. In FIG. 4B, the j-th pixel in the i-th row of each pixel group (each of the first to fourth pixel groups) that generates image signals of the same type is denoted by "the type of the image signal" and (i, j) (where, i and j are integers of 1 to N). For example, the first pixel in the first row of the first pixel group that generates the A image is denoted by A(1, 1). Note that highlighting of the photoelectric conversion portions in FIG. 4B is to make the pixel groups that generate image signals of the same types understandable.

Note that FIG. 4B shows the case where pixels of 2 rows and 2N columns of the pixels in the focus detection region 401 are used for generation of AF signals, but the numbers of rows and columns are not limited to them. It is sufficient that the number of rows is two or more and the number of columns is suitably set generally within the range in which a phase difference can be detected. Note that if no phase difference can be detected or the accuracy is determined to be low, the number of columns may dynamically be increased.

Figure 5:
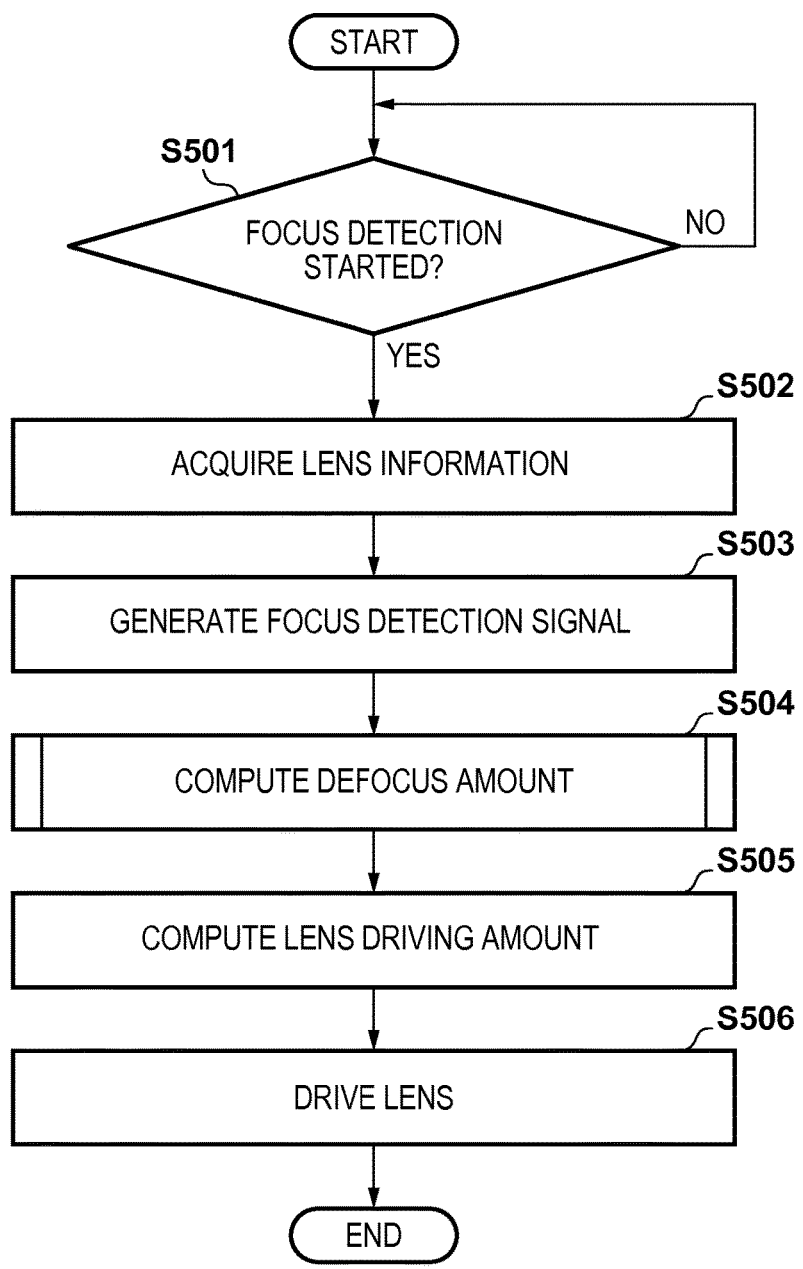
FIG. 5 is a flowchart illustrating the focus adjustment operation according to the embodiment.

Then, the focus adjustment operation of the camera 100 will be described with reference to the flowchart shown in FIG. 5. Note that the processing shown in FIG. 5 is executed in the state (mirror-up state) in which the main mirror 130 and the sub mirror 131 are moved away from the optical path, more specifically, at the time of live view display (photography of a moving image to be displayed) or moving image recording (photography of a moving image to be recorded). Here, the description will be given assuming that automatic focus detection of the phase-difference detection type using outputs of the image sensor 14 is executed, but as described above, automatic focus detection of the contrast detection type may also be executed.

In step S501, the system control unit 50 determines whether or not an instruction to start focus detection has been input by an operation of the SW1 62, the operation unit 70, or the like, and if it is determined that the instruction has been input, the procedure advances to step S502, whereas if it is determined that the instruction has not been input, the procedure stands by. Note that, irrespective of the instruction to start focus detection having been input, the system control unit 50 may advance the procedure to step S502 with the start of live view display or moving image recording serving as a trigger.

In step S502, the system control unit 50 acquires lens frame information on the photographic lens 300 and various types of lens information such as the focus lens position from the lens system control unit 346 via the interface units 38 and 338, and the connectors 122 and 322.

In step S503, the system control unit 50 instructs the image processing unit 20 to generate image signals (the A image, the B image, the GA image, and the GB image) for AF, based on pixel data in the focus detection region among sequentially read frame image data. The image signals for AF are transmitted to the AF unit 42, and are subjected there to processing for correcting a difference in signal level due to a difference in size of the photoelectric conversion portion between the focus detection pixels and the photographing pixels, and the like.

In step S504, the AF unit 42 applies the correlation operation or the like to two pairs of image signals, namely, a pair of the A image and GA image and a pair of the B image and GB image, computes an image shift amount, and converts the computed image shift amount into a defocus amount. Furthermore, the reliability of the computed defocus amount is evaluated by evaluating characteristics of each image signal. The defocus amount computing processing and the reliability evaluating processing in step S504 will be described in detail later. The AF unit 42 outputs the defocus amount to the system control unit 50.

In step S505, the system control unit 50 computes a lens driving amount of the photographic lens 300 based on the defocus amount obtained by the AF unit 42 in step S504.

In step S506, the system control unit 50 transmits the lens driving amount and information on the driving direction to the focus control unit 342 of the photographic lens 300 via the interface units 38 and 338 and the connectors 122 and 322. The focus control unit 342 drives the focus lens based on the received lens driving amount and the information on the driving direction. With this measure, focus adjustment of the photographic lens 300 is performed. Note that the operation of FIG. 5 may also be executed continuously when moving image data from the next frame onward is read.

Figure 6:
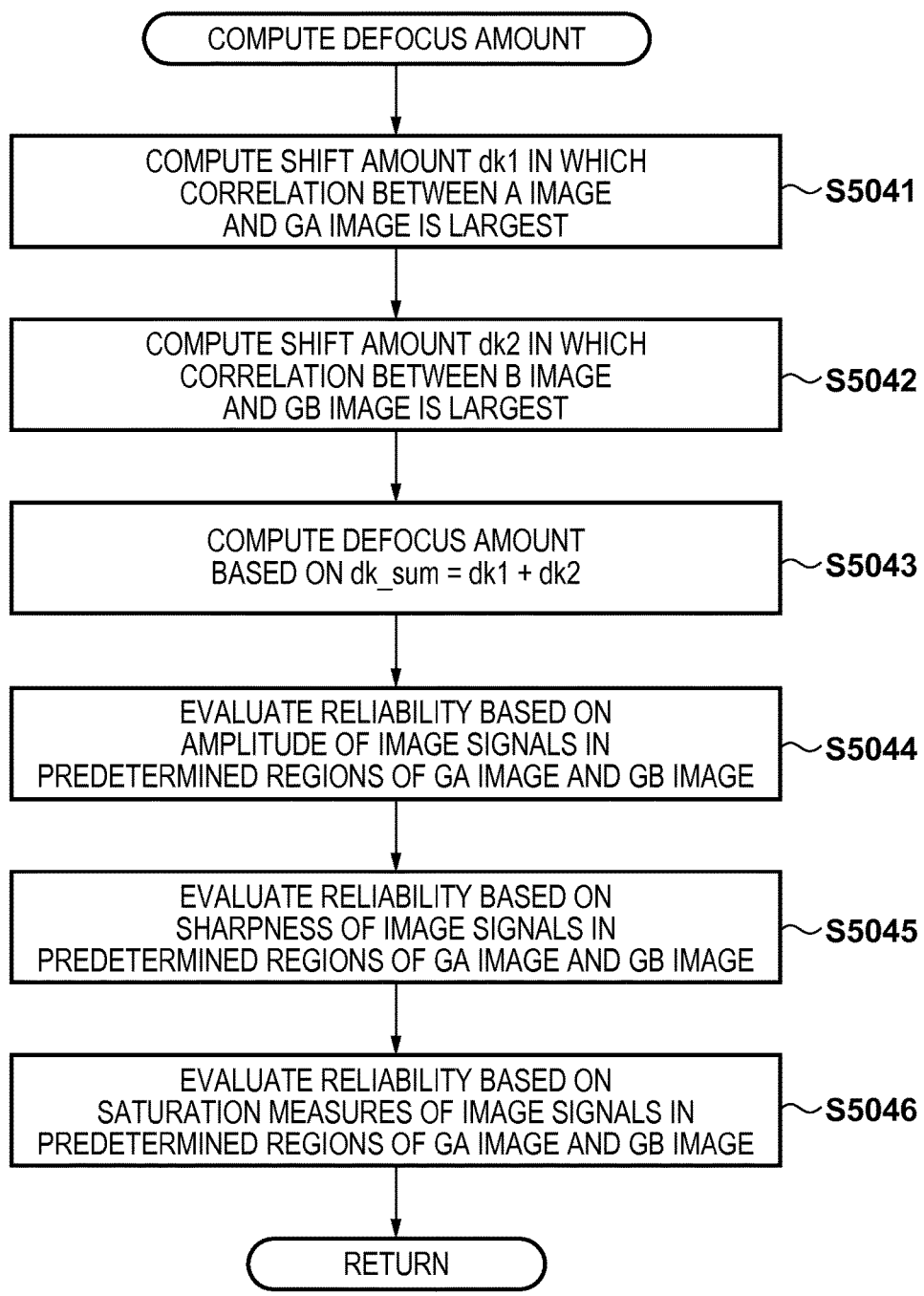
FIG. 6 is a flowchart illustrating a defocus amount computation method according to the first embodiment.

The following will further describe the defocus amount computing processing and the reliability evaluating processing that are executed by the AF unit 42 in step S504 of FIG. 5 with reference to the flowchart shown in FIG. 6.

In step S5041, the AF unit 42 performs correlation operation with respect to the A image and the GA image that are generated in the same pixel row (m-th row, for example). A correlation amount COR1(k) for use in the correlation operation can be computed by, for example, the following formula (1):

$$COR1(k) = \sum_{i=l}^{l+w} |A(m, i+k) - GA(m, i)| \quad (-k\max \leq k \leq k\max) \quad (1)$$

The variable "k" in the formula (1) is a shift amount in the correlation operation, and an integer that is equal to or greater than −kmax and is less than or equal to kmax. Furthermore, the variable "l" is the start position in the horizontal direction of the GA image for which the correlation amount is computed, and the variable "w" is the width (length) of the GA image and the A image for which the correlation amount is computed. As described above, in the present embodiment, since the photoelectric conversion portions of the pixels that generate the GA image are not displaced in the horizontal (X axis) direction, the barycenter, on the exit pupil surface, of a light beam incident on the pixels is not displaced in the horizontal direction, and image shift due to a difference in the traveling angle of the light beam does not occur. On the other hand, since the photoelectric conversion portions of the pixels that generates the A image are displaced in the horizontal (X axis) direction, image shift due to a difference in the traveling angle of a light beam incident on the pixels occurs. Therefore, in the present embodiment, the correlation amount between the A image and the GA image is computed by, as shown in the formula (1), fixing the areas that generate the GA image and shifting the areas that generate the A image. After having obtained the correlation amount COR1(k) of each shift amount k, the AF unit 42 obtains the shift amount k with which the correlation between the A image and the GA image is the largest, that is, the value of the shift amount k with which the correlation amount COR1 is the smallest. Note that the shift amount k at the time of computing the correlation amount COR1(k) is assumed to be an integer, whereas when the shift amount k with which the correlation amount COR1(k) is the smallest is obtained, interpolation processing is appropriately performed to obtain the value in sub pixel unit (real value), in order to improve the accuracy in the defocus amount.

In the present embodiment, a shift amount dk when the sign of a difference value of the correlation amount COR1 changes is computed as the shift amount k with which the correlation amount COR1(k) is the smallest.

First, the AF unit 42 computes a difference value DCOR1 in correlation amount according to the following formula (2):

$$DCOR1(k) = COR1(k) - COR1(k-1) \quad (2)$$

Then, the AF unit 42 obtains a shift amount dk1 when the sign of a difference amount changes, using the difference value DCOR1 in the correlation amount. Assume that a value of "k" immediately before the sign of the difference amount changes is "k1" and a value of "k" whose sign has changed is "k2(k2=k1+1)", the AF unit 42 computes the shift amount dk1 according to the following formula (3):

$$dk1=k1+|DCOR1(k1)-/|DCOR1(k1)-DCOR1(k2)| \quad (3)$$

Accordingly, the AF unit 42 computes the shift amount dk1 with which the correlation amount between the A image and the GA image is the largest in sub pixel unit, and ends the processing in step S5041. Note that the method for computing a phase difference between two one-dimensional image signals is not limited to the method described here, and any well-known method may be used.

In step S5042, the AF unit 42 computes, by the same method as in step S5041, a shift amount dk2 with which the correlation between the B image and the GB image that are generated from the same pixel row (m+1-th row) is the largest.

In step S5043, the AF unit 42 computes the sum dk_sum of two types of the shift amounts dk1 and dk2. As described above, this sum dk_sum corresponds to the phase difference between the A image and the B image. Therefore, the AF unit 42 converts the sum dk_sum of the shift amounts into a defocus amount DEF, by multiplying the sum dk_sum of the shift amounts by the sensitivity stored in advance in, for example, the nonvolatile memory 56. After the computation of the defocus amount DEF, the reliability of the defocus amount DEF is evaluated.

In step S5044, the AF unit 42 computes amplitude PB1 of the GA image generated from a pixel row (m-th row, for example) according to, for example, the following formula (4):

$$PB1 = \text{Max}(GA(m, i)) - \text{Min}(GA(m, i)) \ (i=1, \ldots, 1+w) \quad (4)$$

Here, the range of the variable "i" is the same as that of the formula (1). By computing the amplitude PB1 of the GA image that was used for computation of the correlation amount and in which image shift due to defocus does not occur, it is possible to correctly evaluate the reliability of the defocus amount.

Similarly, the AF unit 42 computes amplitude PB2 of the GB image that was used for computation of the correlation value in step S5042, and evaluates its reliability. If at least one of the amplitude PB1 and PB2 is a predetermined value or less, the AF unit 42 determines that the reliability of the defocus amount DEF computed in step S5043 is low. This predetermined value can be determined in advance through experimental trials or the like. Furthermore, it is also possible that a plurality of values are prepared depending on the photography condition such as the f-number, and evaluation may be performed using the predetermined value that corresponds to the photography condition at the time of defocus amount computation.

In step S5045, the AF unit 42 computes an sharpness SHRP1 of the GA image that was used for computation of the correlation amount, according to, for example, the following formula (5):

$$SHRP1(k) = \frac{\sum_{i=l}^{i+w-1} (GA(m, i) - GA(m, i+1))^2}{\sum_{i=l}^{i+w-1} |GA(m, i) - GA(m, i+1)|} \quad (5)$$

The same principle as that of the formula (1) is applied to the value of the variable "i" for use in the formula (5). By computing the sharpness SHRP1 of the GA image that was used for computation of the correlation amount and in which image shift due to defocus does not occur, it is possible to correctly evaluate the reliability of the defocus amount.

Similarly, the AF unit 42 computes an sharpness SHRP2 of the GB image that was used for computation of the correlation value in step S5042, and evaluates its reliability. If at least one of the sharpnesses SHRP1 and SHRP2 is a predetermined value or less, the AF unit 42 determines that the reliability of the defocus amount DEF computed in step S5043 is low. This predetermined value can be determined in advance through experimental trials or the like. Furthermore, it is also possible that a plurality of values are prepared depending on the photography condition such as the f-number, and evaluation may be performed using the predetermined value that corresponds to the photography condition at the time of defocus amount computation.

In step S5046, the AF unit 42 computes a saturation measure SALT1 of the GA image that was used for computation of the correlation amount. The saturation measure SALT1 can be computed as, for example, the number or percentage of pixels having a pixel value equal to or greater than a predetermined value in the plurality of pixels constituting the GA image. By computing the saturation measure SALT1 of the GA image that was used for computation of the correlation amount and in which image shift due to defocus does not occur, it is possible to correctly evaluate the reliability of the defocus amount.

Similarly, the AF unit 42 computes a saturation measure SALT2 of the GB image that was used for computation of the correlation value in step S5042, and evaluates its reliability. If at least one of the saturation measures SALT1 and SALT2 is a predetermined value or greater, the AF unit 42 determines that the reliability of the defocus amount DEF computed in step S5043 is low. This predetermined value can be determined in advance through experimental trials or the like. Furthermore, it is also possible that a plurality of values are prepared depending on the photography condition such as the f-number, and evaluation may be performed using the predetermined value that corresponds to the photography condition at the time of defocus amount computation.

The AF unit 42 determines the eventual evaluation result of the defocus amount DEF, based on the evaluation results on the basis of the amplitude (step S5044), the sharpness (step S5045), and the saturation measures (step S5046). At that time, it is possible to determine that the reliability of the eventual defocus amount DEF is low if there is at least one evaluation result showing the low reliability, or if there are two or more evaluation results showing the low reliability, or if there are three evaluation results showing the low reliability. In the case where the reliability of the eventual defocus amount DEF is determined as being low if there is at least one evaluation result showing the low reliability, a configuration is also possible in which when the evaluation result showing the low reliability is obtained in step S5044 or S5045, the subsequent procedure is not performed.

When the system control unit 50 computes the lens driving amount of the photographic lens 300 in step S505, the lens driving amount can be computed based on any of the plurality of defocus amounts obtained in the focus detection region other than that determined as having a low reliability. With this measure, the defocus amount determined as having a low reliability does not affect the lens driving amount, allowing focus adjustment with higher accuracy.

As described above, in the present embodiment, A image and the B image, which are signals obtained by photoelectrically converting light beams that pass through different regions on the exit pupil of the imaging optical system, are generated by pixel groups located apart from each other in the direction (Y-axis direction) perpendicular to the phase-difference detection direction (X-axis direction). Accordingly, the positions of a subject optical image that are sampled by the A image and the B image are different from each other, and it is thus not ensured that the degree of similarity between the A image and the B image is high. When a phase difference between two signals is obtained based on the correlation amount, a highly accurate phase difference can be obtained in the case where the degree of similarity between the two signals is high. In the present embodiment, the GA image, which can sample substantially the same position on the subject optical image as that of the A image, is generated, and a phase difference between the A image and the GA image is computed. Similarly, a phase difference between the B image and the GB image is also computed. By summing these two phase difference computation results, it is possible to compute a phase difference between the A image and the B image with high accuracy.

Furthermore, when a phase difference between the A image (B image) and the GA image (GB image) is computed, highly accurate computation of the phase difference between the images is possible by obtaining the correlation amount while shifting a section of the A image (B image) with respect to a fixed section of the GA (GB) image in which no image shift due to defocus occurs.

Furthermore, by evaluating the reliability of the defocus amount based on the amplitude, the sharpnesses, and the saturation measures of the GA image and the GB image in which no image shift due to defocus occurs, it is possible to evaluate the reliability of the obtained defocus amount with high accuracy.

Furthermore, since a phase difference between the A image and the GA image and a phase difference between the B image and the GB image are summed up to compute a phase difference between the A image and B image, the phase difference per unit defocus amount becomes greater than the phase difference between the A image and the GA image (or between the B image and the GB image). Accordingly, it is possible to reduce the influence of noise included in a phase difference detection result and to perform highly accurate phase difference detection.

With such a configuration, it is possible to obtain a phase difference between the A image and the B image with high accuracy, even when the degree of similarity between the A image and the B image is low. Accordingly, the degree of freedom in arrangement of the pixel group (first pixel group) that generates the signals of the A image and the pixel group (second pixel group) that generates signals of the B image is improved, making it possible to arrange focus detection pixels at positions at which correction is easily performed when signals for image capturing are generated. As a result, accuracy in correction of pixel values of the focus detection pixels is improved, making it possible to realize high image quality.

Note that in the present embodiment, the phase difference dk1 (first phase difference) that is obtained using the correlation amount between the A image and the GA image, and the phase difference dk2 (second phase difference) that is obtained using the correlation amount between the B image and the GB image are computed, and the sum of the phase differences dk1 and dk2 is converted into the defocus amount. However, the defocus amount computing method is not limited to this. For example, it is also possible that a correlation amount (first correlation amount) between the A image and the GA image and a correlation amount (second correlation amount) between the B image and the GB image that correspond to the same shift amount k are summed up, and a defocus amount is computed based on the shift amount dk with which the sum of the two correlation amounts is the smallest. In this case, although the phase difference that is detected between the A image and the B image is small, a difference in the correlation amount can be great, improving the accuracy in shift amount detection.

Furthermore, when a defocus amount is computed based on a shift amount, the sum of the phase differences dk1 and dk2 is multiplied by the sensitivity. However, it is also possible that sensitivities for the phase difference dk1 and for the phase difference dk2 are stored in advance in the nonvolatile memory 56, and a defocus amount may be computed by multiplying the respective phase differences by the corresponding sensitivities, and then summing up the products. Although large capacity for storing the sensitivities is needed, it is possible to perform focus detection with higher accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179520, filed on Sep. 3, 2014, which is hereby incorporated by reference herein in its entirety.

What is claimed is:

1. A focus-detection device comprising:
   a first detecting unit configured to detect a first phase difference between a first image signal based on a light beam that has passed through a partial region of an exit pupil of an imaging optical system, and a third image signal based on a light beam that has passed through the entire region of the exit pupil;

a second detecting unit configured to detect a second phase difference between a second image signal based on a light beam that has passed through another partial region of the exit pupil, and a fourth image signal based on a light beam that has passed through the entire region of the exit pupil; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in a predetermined direction, and the second detecting unit detects the second phase difference while shifting a section of the second image signal with respect to a fixed section of the fourth image signal in the predetermined direction.

2. The focus-detection device according to claim 1, wherein the computing unit further evaluates reliability of the defocus amount based on amplitude, sharpnesses, or saturation measures of the third image signal and the fourth image signal.

3. The focus-detection device according to claim 2, wherein the computing unit evaluates reliability of the defocus amount based on the fixed section of the third image signal that is used for detecting the first phase difference, and the fixed section of the fourth image signal that is used for detecting the second phase difference.

4. A focus-detection device comprising:

a first detecting unit configured to detect a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface;

a second detecting unit configured to detect a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in the first direction or the second direction, and the second detecting unit detects the second phase difference while shifting a section of the second image signal with respect to a fixed section of the fourth image signal in the first direction or the second direction.

5. The focus-detection device according to claim 4, wherein the computing unit further evaluates reliability of the defocus amount based on amplitude, sharpnesses, or saturation measures of the third image signal and the fourth image signal.

6. The focus-detection device according to claim 5, wherein the computing unit evaluates reliability of the defocus amount based on the fixed section of the third image signal that is used for detecting the first phase difference, and the fixed section of the fourth image signal that is used for detecting the second phase difference.

7. An image capture apparatus comprising:

an image sensor capable of reading an image signal based on a light beam that has passed through a partial region of an exit pupil of an imaging optical system, and an image signal based on a light beam that has passed through the entire region of the exit pupil; and a focus-detection device, wherein the focus-detection device comprises:

a first detecting unit configured to detect a first phase difference between a first image signal based on a light beam that has passed through a partial region of an exit pupil of an imaging optical system, and a third image signal based on a light beam that has passed through the entire region of the exit pupil;

a second detecting unit configured to detect a second phase difference between a second image signal based on a light beam that has passed through another partial region of the exit pupil, and a fourth image signal based on a light beam that has passed through the entire region of the exit pupil; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in a predetermined direction, and the second detecting unit detects the second phase difference while shifting a section of the second image signal with respect to a fixed section of the fourth image signal in the predetermined direction.

8. An image capture apparatus comprising:

an image sensor capable of reading an image signal based on a light beam that has passed through a partial region of an exit pupil of an imaging optical system, and an image signal based on a light beam that has passed through the entire region of the exit pupil; and a focus-detection device, wherein the focus-detection device comprises:

a first detecting unit configured to detect a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface;

a second detecting unit configured to detect a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in the first direction or the second direction, and the second detecting unit detects the second phase difference while shifting a section of the second image signal with respect to a fixed section of the fourth image signal in the first direction or the second direction.

9. An image capture apparatus comprising:

an image sensor capable of reading an image signal based on a light beam that has passed through a partial region of an exit pupil of an imaging optical system, and an image signal based on a light beam that has passed through the entire region of the exit pupil;

a focus-detection device; and a focus adjustment unit configured to perform focus adjustment of the imaging optical system based on the defocus amount obtained by the computing unit, wherein the focus-detection device comprises:

a first detecting unit configured to detect a first phase difference between a first image signal based on a light beam that has passed through a partial region of an exit pupil of an imaging optical system, and a third image signal based on a light beam that has passed through the entire region of the exit pupil;

a second detecting unit configured to detect a second phase difference between a second image signal based on a light beam that has passed through another partial region of the exit pupil, and a fourth image signal based on a light beam that has passed through the entire region of the exit pupil; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in a predetermined direction, and the second detecting unit detects the second phase difference while shifting a section of the second image signal with respect to a fixed section of the fourth image signal in the predetermined direction, wherein the computing unit evaluates reliability of the defocus amount based on the fixed section of the third image signal that is used for detecting the first phase difference, and the fixed section of the fourth image signal that is used for detecting the second phase difference, and wherein the focus adjustment unit performs the focus adjustment based on any of the defocus amounts other than that evaluated as having a low reliability.

10. An image capture apparatus comprising:

an image sensor capable of reading an image signal based on a light beam that has passed through a partial region of an exit pupil of an imaging optical system, and an image signal based on a light beam that has passed through the entire region of the exit pupil;

a focus-detection device; and a focus adjustment unit configured to perform focus adjustment of the imaging optical system based on the defocus amount obtained by the computing unit, wherein the focus-detection device comprises:

a first detecting unit configured to detect a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface;

a second detecting unit configured to detect a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in the first direction or the second direction, and the second detecting unit detects the second phase difference while shifting a section of the second image signal with respect to a fixed section of the fourth image signal in the first direction or the second direction, wherein the computing unit further evaluates reliability of the defocus amount based on amplitude, sharpnesses, or saturation measures of the third image signal and the fourth image signal, and wherein the focus adjustment unit performs the focus adjustment based on any of the defocus amounts other than that evaluated as having a low reliability.

11. A method for controlling a focus-detection device comprising:

a first detecting step of detecting a first phase difference between a first image signal based on a light beam that has passed through a partial region of an exit pupil of an imaging optical system, and a third image signal based on a light beam that has passed through the entire region of the exit pupil;

a second detecting step of detecting a second phase difference between a second image signal based on a light beam that has passed through another partial region of the exit pupil, and a fourth image signal based on a light beam that has passed through the entire region of the exit pupil; and a computing step of computing a defocus amount of an imaging optical system using a sum of the first phase difference and the second phase difference, wherein in the first detecting step, the first phase difference is detected while a section of the first image signal is shifted with respect to a fixed section of the third image signal in a predetermined direction, and in the second detecting step, the second phase difference is detected while a section of the second image signal is shifted with respect to a fixed section of the fourth image signal in the predetermined direction.

12. A method for controlling a focus-detection device, comprising:

a first detecting step of detecting a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface;

a second detecting step of detecting a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing step of computing a defocus amount of the imaging optical system using a sum of the first phase difference and the second phase difference, wherein in the first detecting step, the first phase difference is detected while a section of the first image signal is shifted with respect to a fixed section of the third image signal in the first direction or the second direction, and in the second detecting step, the second phase difference is detected while a section of the second image signal is shifted with respect to a fixed section of the fourth image signal in the first direction or the second direction.

13. A non-transitory computer-readable storage medium having stored therein a program for causing a computer to function as a focus-detection device comprising:

a first detecting unit configured to detect a first phase difference between a first image signal based on a light beam that has passed through a partial region of an exit pupil of an imaging optical system, and a third image signal based on a light beam that has passed through the entire region of the exit pupil;

a second detecting unit configured to detect a second phase difference between a second image signal based on a light beam that has passed through another partial region of the exit pupil, and a fourth image signal based on a light beam that has passed through the entire region of the exit pupil; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in a predetermined direction, and the second detecting unit detects the second phase difference while shifting a section of the second image signal with respect to a fixed section of the fourth image signal in the predetermined direction.

14. A non-transitory computer-readable storage medium having stored therein a program for causing a computer to function as a focus-detection device comprising:

a first detecting unit configured to detect a first phase difference between a first image signal based on an output of a photoelectric conversion area of which an incident light beam having a barycenter position, on an exit pupil surface of an imaging optical system, displaced from a center of the exit pupil surface in a first direction, and a third image signal based on an output of a photoelectric conversion area of which an incident light beam having a barycenter position, on the exit pupil surface, not displaced from the center of the exit pupil surface;

a second detecting unit configured to detect a second phase difference between a second image signal based on an output of a photoelectric conversion area of which an incident light beam having a barycenter position, on the exit pupil surface, displaced from the center of the exit pupil surface in a second direction that is opposite to the first direction, and a fourth image signal based on an output of a photoelectric conversion area of which an incident light beam having a barycenter position, on the exit pupil surface, not displaced from the center of the exit pupil surface; and a computing unit configured to compute a defocus amount of the imaging optical system using a sum of the first phase difference and the second phase difference, wherein the first detecting unit detects the first phase difference while shifting a section of the first image signal with respect to a fixed section of the third image signal in the first direction or the second direction, and the second detecting unit detects the second phase difference while shifting a section of the second image signal with respect to a fixed section of the fourth image signal in the first direction or the second direction.

* * * * *